United States Patent
Tawaragi (10) Patent No.: US 7,362,681 B2
(45) Date of Patent: Apr. 22, 2008

(54) RECORDING MEDIUM TYPE DETERMINING APPARATUS AND METHOD FOR DETERMINING PRESENCE OF WOBBLE ON A RECORDING MEDIUM

(75) Inventor: Yuji Tawaragi, Tokorozawa (JP)

(73) Assignee: Pioneer Corporation, Tokyo (JP)

( * ) Notice: Subject to any disclaimer, the term of this patent is extended or adjusted under 35 U.S.C. 154(b) by 495 days.

(21) Appl. No.: 10/624,886

(22) Filed: Jul. 23, 2003

(65) Prior Publication Data

US 2004/0130991 A1 Jul. 8, 2004

(30) Foreign Application Priority Data

Jul. 23, 2002 (JP) ............... 2002-213688

(51) Int. Cl.
*G11B 7/00* (2006.01)
(52) U.S. Cl. .............................. 369/53.23; 369/53.34
(58) Field of Classification Search ............... None
See application file for complete search history.

(56) References Cited

U.S. PATENT DOCUMENTS

| | | | | |
|---|---|---|---|---|
| 5,646,919 A | * | 7/1997 | Eastman et al. | 369/44.26 |
| 5,684,771 A | * | 11/1997 | Furukawa et al. | 369/53.23 |
| 6,466,531 B1 | * | 10/2002 | Lee | 369/53.2 |
| 6,822,936 B2 | * | 11/2004 | Ono et al. | 369/53.23 |
| 2002/0067672 A1 | * | 6/2002 | Yanagawa et al. | 369/53.19 |
| 2002/0172361 A1 | * | 11/2002 | Furukawa et al. | 380/201 |
| 2003/0012098 A1 | * | 1/2003 | Sako et al. | 369/47.12 |
| 2003/0165095 A1 | * | 9/2003 | Iimura et al. | 369/47.22 |

FOREIGN PATENT DOCUMENTS

| | | |
|---|---|---|
| EP | 1187111 A2 * | 3/2002 |
| JP | 10-302381 | 11/1998 |

* cited by examiner

*Primary Examiner*—Andrea Wellington
*Assistant Examiner*—Peter Vincent Agustin
(74) *Attorney, Agent, or Firm*—Kratz, Quintos & Hanson, LLP (57) ABSTRACT

A push-pull signal Spp fetched with tracking open is smoothed to a smoothing signal Spp to remove signal components generated wobbling due to radial runout, and the smoothing signal is binarized to compute an autocorrelation value in the autocorrelation computing circuit 210. This computing is made by multiplying the binarized signal by a signal delayed by the half cycle and sign-negated to compute the integrated value, and the integrated value output signal Dint is generated. A maximum value of the integrated value output signal Dint within a predetermined period of time is computed by the maximum value holding circuit 220 to output a maximum value output signal Dout. Depending on the amplitude of the maximum value signal Dout, the CPU 105 determines whether the recording medium is a writable one or read only one. Wobble determination can be made keeping tracking open, and a type of a recording medium is carried out accurately.

7 Claims, 9 Drawing Sheets

RECORDING MEDIUM TYPE DETERMINING APPARATUS AND METHOD FOR DETERMINING PRESENCE OF WOBBLE ON A RECORDING MEDIUM

BACKGROUND OF THE INVENTION

1. Field of the Invention

The present invention relates to a recording medium type determining apparatus and a recording medium type determining method for determining the type of a recording medium based on a radial push-pull signal.

2. Description of the Related Art

There have been known recording media based on various standards including optical discs such as a DVD-ROM (Digital Versatile Disc—Read Only Memory) as read only recording media with information previously recorded therein and used only for reproducing the information therefrom, and those such as a DVD-R (Digital Versatile Disc—Recordable) and a DVD-RW (Digital Versatile Disc—Re-Writable) as writable recording media in which information can be recorded. In the DVD-ROM, a bit array is formed in a spiral form on the base plate, and information is reproduced by irradiating a light beam onto this bit array. On the other hand, in the DVD-R or DVD-RW (sometimes described as DVD-R/RW hereinafter), a guide groove called as wobbling groove is formed in a spiral form on the base plate, and information is recorded therein or reproduced therefrom by irradiating a light beam onto this groove.

For recording and reproducing information, focus servo control and tracking servo control for a light beam are required, but in the DVD-ROM, as the radial push-pull signal at a sufficient level can not be obtained from the read signal, different tracking servo control systems are employed for the DVD-ROM and DVD-RW respectively. More specifically, in the DVD-ROM, the tracking servo control system based on the DPD (Differential Phase Detection) method is generally employed, while in the DVD-RW, the tracking servo control based on the DPP (Differential Push-Pull) method is generally employed.

For the reason as described above, the type of a recording medium set on the information recording/reproducing apparatus needs to be determined, and as the technology for determining the type of a recording medium, there has been known, for instance, the recording medium type determining apparatus as described in Japanese Patent Laid-Open Publication No. HEI 10-302381. This determining apparatus operates based on the fact that the amplitude of a radial push-pull signal obtained when a light beam is moved in the radial direction of a disc in the DVD-ROM is different from that in DVD-R. This determining apparatus is based on the configuration in which, during reproduction with the tracking servo control for a light beam kept open, the level of a radial push-pull signal is compared to a reference level, and the type of an optical disc is determined according to the result of the comparison (Refer to page 4, line 35 to line 50 in the left column of the Publication).

However, in some DVD-ROMs, the amplitude of the radial push-pull signal is relatively large, and with the determining apparatus described above, sometimes it is difficult to set a reference level, and erroneous determination of a disc type may be performed.

SUMMARY OF THE INVENTION

The present invention was made to solve the problems as described above, and a main object of the present invention is to provide a recording medium type determining apparatus and a recording medium type determining method for accurately determining the type of a recording medium.

The present invention provides a recording medium type determining apparatus for determining a type of a recording medium in the reproducing state where the tracking servo control is kept open, and the recording medium type determining apparatus comprises a signal generating section for generating a radial push-pull signal based on a read-out signal from a recording medium; a processing section for processing the radial push-pull signal making use of autocorrelation; and a determining section for determining the type of the recording medium based on the data sent from the processing section.

The present invention further provides a recording medium type determining method of determining a type of a recording medium in the reproducing state where the tracking servo control is kept open, and the recording medium type determining method comprises the steps of: generating a radial push-pull signal based on a read signal from a recording medium; processing the radial push-pull signal making use of autocorrelation; and determining the type of the recording medium based on the data sent during the processing above.

DETAILED DESCRIPTION OF THE PREFERRED EMBODIMENT(S)

One embodiment of the present invention is described below with reference to the related drawings.

[Configuration of an Optical Disc Drive]

At first, general configuration of the optical disc 100 as one embodiment in which a recording medium type determining apparatus according to the present invention is used is described below with reference to the block diagram shown in FIG. 1. It is to be noted that, as the configuration for recording information in and reproducing information from an optical disc DK is well known, detailed description thereof is not made herein.

The optical disc DK used in the optical disc drive 100 is classified to a read only optical disc with information previously recorded and used only for reading out the information therefrom such as a DVD-ROM (Digital Versatile Disc—Read Only Memory), and a writable optical disc in which information can be recorded and rewritten in a wobbling groove track thereon, such as a DVD-R (Digital Versatile Disc—Recordable) or a DVD-RW (Digital Versatile Disc—Rewritable).

Figure 1:
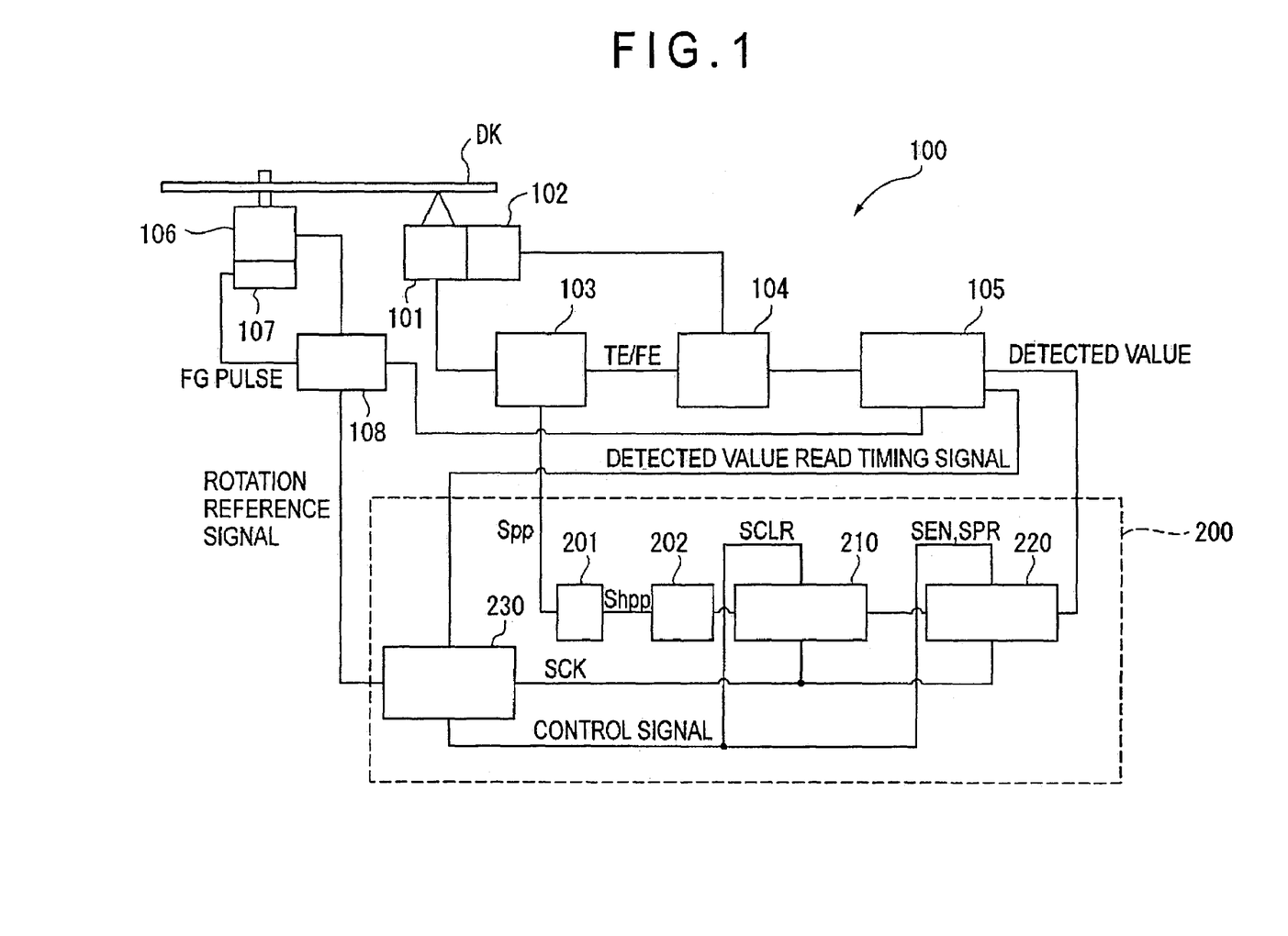
FIG. 1 is a block diagram showing general configuration of an optical disc drive 100 in which a recording medium type determining apparatus according to one embodiment of the present invention is applied.

The optical disc drive 100 comprises, as shown in FIG. 1, an optical pick-up (PU) 101, an actuator (ACT) 102, a signal generating circuit 103 as a signal generating section, a focus and tracking servo circuit (FCS/TRK servo circuit) 104, a processor (CPU) 105 as a determining section, a spindle motor (SPDL) motor 106, a frequency generating circuit (FG) 107, a FC servo circuit 108, and a wobble signal detecting circuit 200 as a processing section.

The optical disc drive 100 generates a radial push-pull signal by closing, of the servo controls for the PU 101, only the focus servo control and rotating the optical disc at a prespecified number of revolutions per unit time, and the details are described hereinafter.

The SPDL motor 106 has a turn table (not shown) and fixed to a rotation shaft thereof to drive and rotate an optical disc DK set on the turn table. The FG107 detects a rotational speed of the SPDL motor 106, and generates an FG pulse signal indicating a rotational speed of the SPDL motor 106, and outputs the signal to the FG servo circuit 108.

The FG servo circuit 108 compares a rotation reference signal sent from the wobble signal detecting circuit 200 to the FG pulse signal sent from the FG 107 and thereby maintains a rotational speed of the SPDL motor 106 at a prespecified constant speed. The term of "rotational speed" as used herein indicates a number of revolutions per unit time at which a wobble signal with a required frequency (140 kHz) can be obtained from the radial push-pull signal described later when the PU 101 is positioned at a known position in the radial direction of the optical disc DK, for instance, at the innermost peripheral position.

The PU 101 comprises a laser diode, a polarized beam splitter, an object lens, a quadrupole light detector, all of which are not shown. Further connected to the PU 101 is the ATC 102. An object lens of the PU 101 is driven by this ACT 102 in the focus direction (vertical to a disc surface) and in the tracking direction (in the radial direction of the disc). Further the PU 101 irradiates a light beam to the optical disc DK, and receives the reflected light with the quadrupole light detector. Then the PU 101 outputs a read signal from the optical disc converted to an electric signal by the quadrupole detector.

The signal generating circuit 103 generates, based on the read signal from the PU 101, a focus error signal FE for focus control for the light beam, a tracking error signal TE for tracking control for the light beam, and a radial push-pull signal Spp. The radial push-pull signal Spp is generated by computing a difference between a signal detected by the quadrupole light detector in the innermost peripheral side of the disc and that detected in the outermost peripheral side of the disc when viewed optically. The signal generating circuit 103 outputs the focus error signal FE and the tracking error signal TE to the FCS/TRK servo circuit 104, and further outputs the radial push-pull signal Spp to the wobble signal detecting circuit 200.

The FCS/TRK servo circuit 104 drives the ACT 102 based on the focus error signal FE and the tracking error signal TE sent from the signal generating circuit 103 to provide the focus servo control and tracking servo control for a light beam, and closes (for enabling servo control) or opens (for disabling the servo control) each servo control according to an instruction from the CPU 105.

The CPU 105 detects a detected value sent from the wobble signal detecting circuit 200 depending on a detected value read timing signal as a trigger, and determines the type of an optical disc, i.e. whether the optical disc is a DVD-ROM or a DVD-R/RW.

The wobble signal detecting circuit 200 detects a wobble signal from a radial push-pull signal Spp sent from the signal generating circuit 103 by means of autocorrelation, and comprises a high-pass filter (HPF) 201, a binarizing circuit 202, a reference signal generating circuit 230, an autocorrelation computing circuit 210, and a maximum value holding circuit 220.

The HPF 201 fetches a radial push-pull signal Spp sent from the signal generating circuit 103, generates a smoothing signal shpp in which the level fluctuation factors contained in this radial push-pull signal caused by tracking servo open, i.e. caused by the radial run out of the optical disc DK are reduced, and outputs the smoothing signal to the binarizing circuit 202.

The binarizing circuit 202 binarizes the smoothing signal Shpp. i.e. the binarizing circuit 202 converts the smoothing signal Shpp to a digital value comprising a H-level output component and a L-level output component, and sends the digital value to the autocorrelation computing circuit 210.

The autocorrelation computing circuit 210 computes an autocorrelation value of the digital signal fetched from the binarizing circuit 202 based on a reference clock signal SCK and a control signal each sent from a reference signal generating circuit 230, and sends the result of computing to the maximum value holding circuit 220. It is to be noted that the autocorrelation value as used herein indicates a value extracted by means of the so-called time autocorrelation function.

The maximum value holding circuit 220 detects a maximum value of the autocorrelation value for the digital signal fetched from the autocorrelation computing circuit 210 based on the reference clock signal SCK and control signal each sent from the reference signal generating circuit 230, and outputs the detected value to the CPU 105.

The reference signal generating circuit 230 generates the rotation reference signal, detected value read timing signal, reference clock signal SCK and control signal each described above, and sends the rotation reference signal to the FG servo circuit 108, the detected value read timing signal to the CPU 105, and the reference clock SCK and control signal to the autocorrelation computing circuit 210 as well as to the maximum value holding circuit 220.

Next the autocorrelation computing circuit 210 and maximum value holding circuit 220 each constituting the wobble signal detecting circuit 200 are described in detail below with reference to the block diagram shown in FIG. 2.

Figure 2:
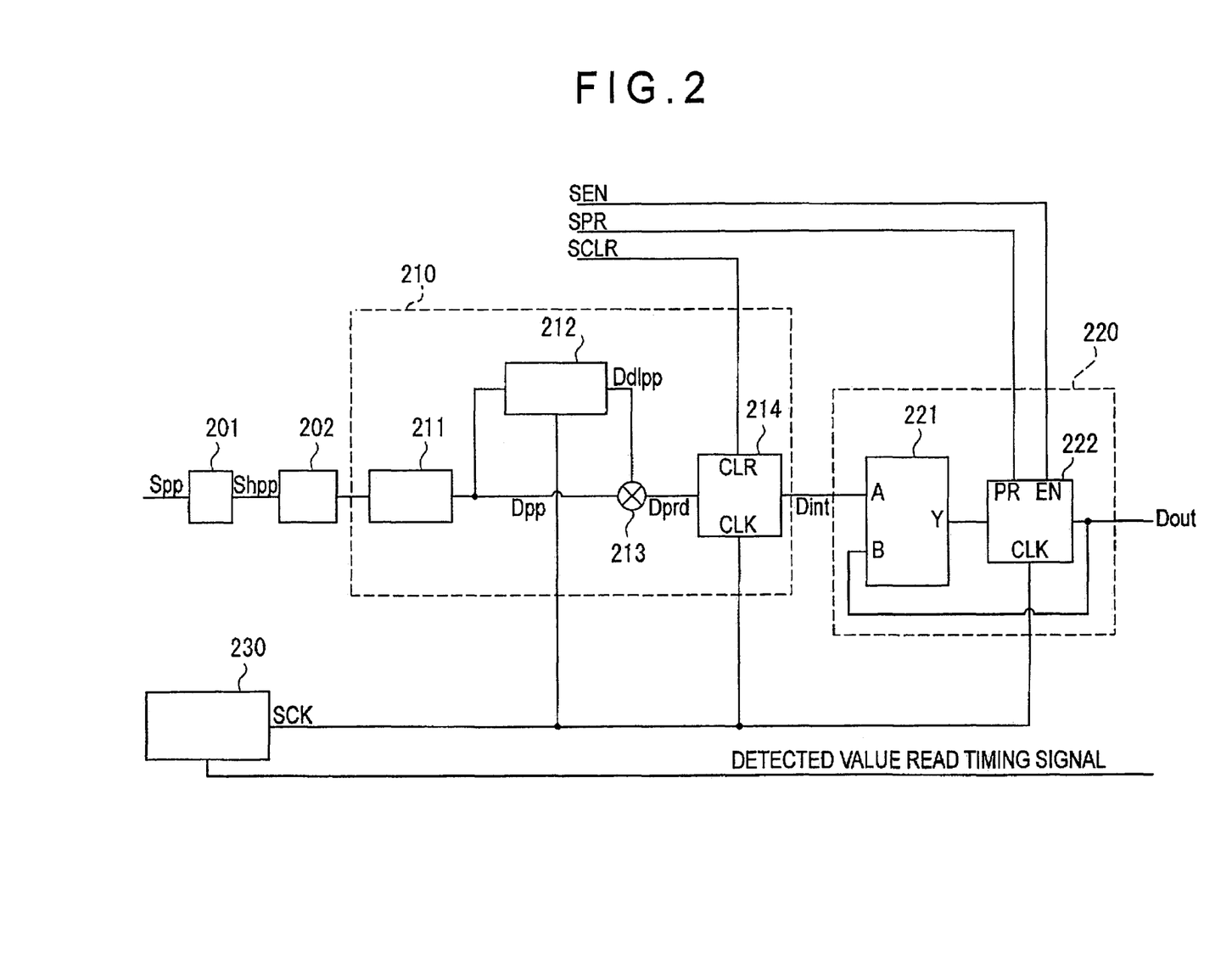
FIG. 2 is a block diagram showing general configuration of a wobble signal detecting circuit 200 shown in FIG. 1.

As shown in FIG. 2, the autocorrelation computing circuit 210 comprises a data converter 211, a delay/sign-negator (a delay/sign-inverter) 212, a multiplier 213, and an integrator 214.

The reference signal generating circuit 230 generates the detected value read timing signal, reference clock signal SCK, and control signal as described above, and the control signal contains a zero-clear signal SCLR, a latch enabling signal SEN, and a minimum value setting signal SPR. The reference signal generating circuit 230 sends the detected value read timing signal to the CPU 105, the reference clock signal SCK to the delay/sign-negator 212, integrator 214 and to a D flip-flop 222, the zero clear signal SCLR to the integrator 214, and the latch enabling signal SEN and the minimum value setting signal SPR to the D flip-flop 222.

The data converter 211 converts the digital signal comprising an H-level component and a L-level component generated from the binarizing circuit 202 to an output signal DPP indicating a discrete value with positive or negative (+1/−1) sign, and outputs the output signal Dpp to the delay/sign-negator 212 as well as to the multiplier 213.

The delay/sign-negator 212 comprises a shift register with a prespecified number of stages and a sign-negator (each not shown), and determines the delay time according to the stage number of the shift register and a frequency of the reference clock signal SCK sent from the reference signal generating circuit 230. In this embodiment, the delay time is set to a half cycle of the wobble signal contained in the radial push-pull signal Spp. In other words, the delay/sign-negator 212 delays the discrete value output signal Dpp by a half cycle of the wobble signal, and output the delayed/sign-negated output signal Ddlpp to the multiplier 213.

The multiplier 213 multiplies the discrete value output signal Dpp sent from the data converter 211 with the delayed/sign-negated output signal Ddlpp sent from the delay/sign-negator 212, and outputs a multiplied value output signal Dprd to the integrator 214.

The integrator 214 integrates the multiplied value output signal Dprd sent from the multiplier 213, and outputs an integrated value output signal Dint to a data comparator 221 in the maximum value holding circuit 220. The integrator 214 also clears the integrated value output signal Dint to zero according to the zero clear signal SCLR sent from the reference signal generating circuit 230.

On the other hand, the maximum value holding circuit 220 comprises a data comparator 221 and a D flip-flop 222.

The data comparator 221 receives, at the input terminal A, the integrated value output signal Dint generated from the autocorrelation computing circuit 210, and also receives, at the input terminal B, the maximum value output signal Dout sent from the D flip-flop 222. The data comparator 221 compares amplitudes of the signals received at the input terminals A and B, and outputs a signal with a larger amplitude from the output terminal Y.

The D flip-flop 222 receives the minimum value setting signal SPR and the latch enabling signal SEN sent from the reference signal generating circuit 230 at the minimum value setting terminal PR and the latch enabling terminal EN respectively. Further the D flip-flop 222 receives, at the clock signal terminal CLK, the reference clock signal SCK sent from the reference signal generating circuit 230. The D flip-flop 222 sets a level at the output terminal Y to the minimum value (−MAX) when the minimum value setting signal SPR goes high, and latches the data outputted from the output terminal Y of the data comparator 221 when the latch enabling signal SEN goes high.

(Operations of the Autocorrelation Value Computing Circuit)

Figure 3:
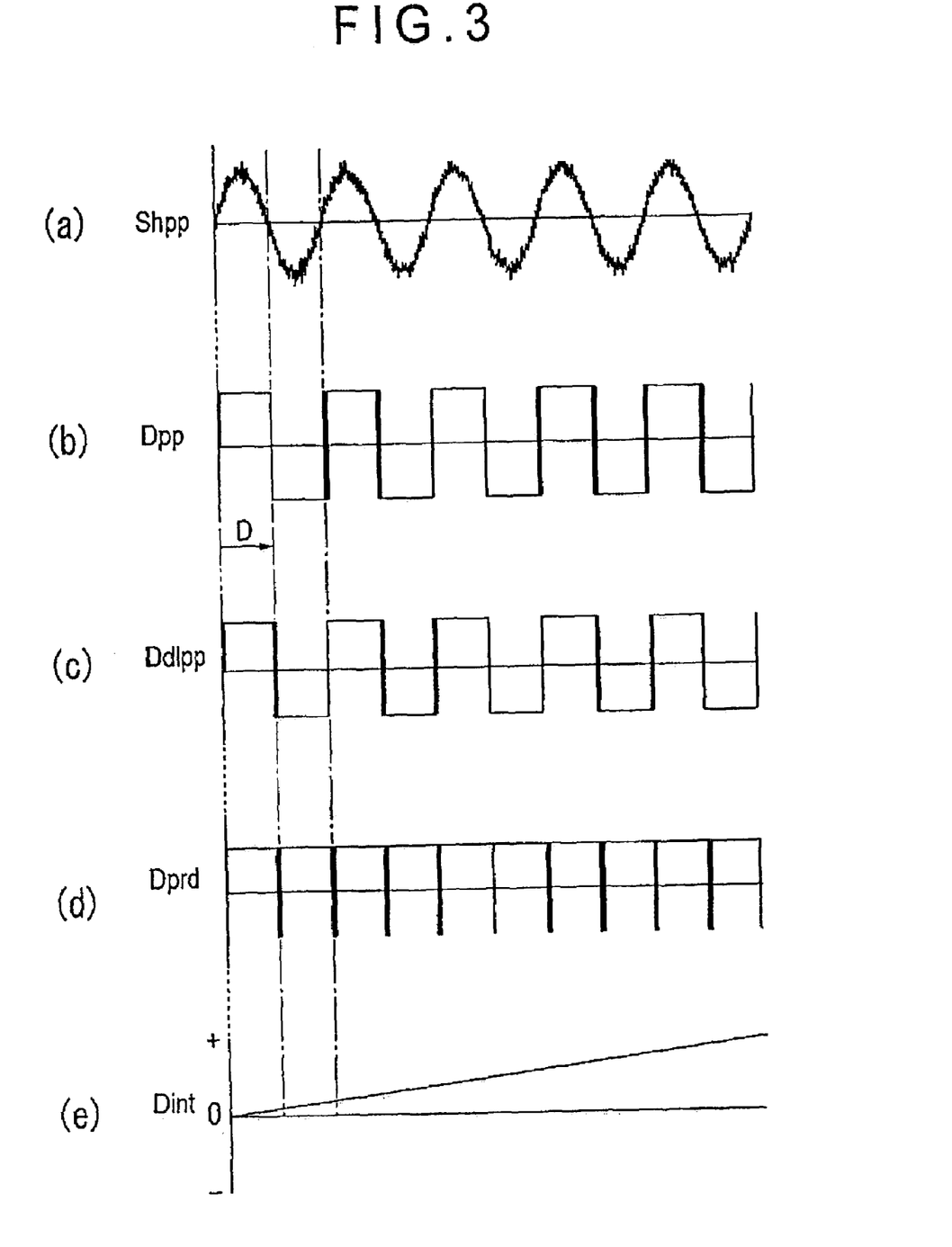
FIG. 3 is a waveform diagram showing change of each signal in the wobble signal detecting circuit 200 when a sinusoidal wave signal having the frequency of ½ D is being received as a smoothing signal Shpp.
Figure 4:
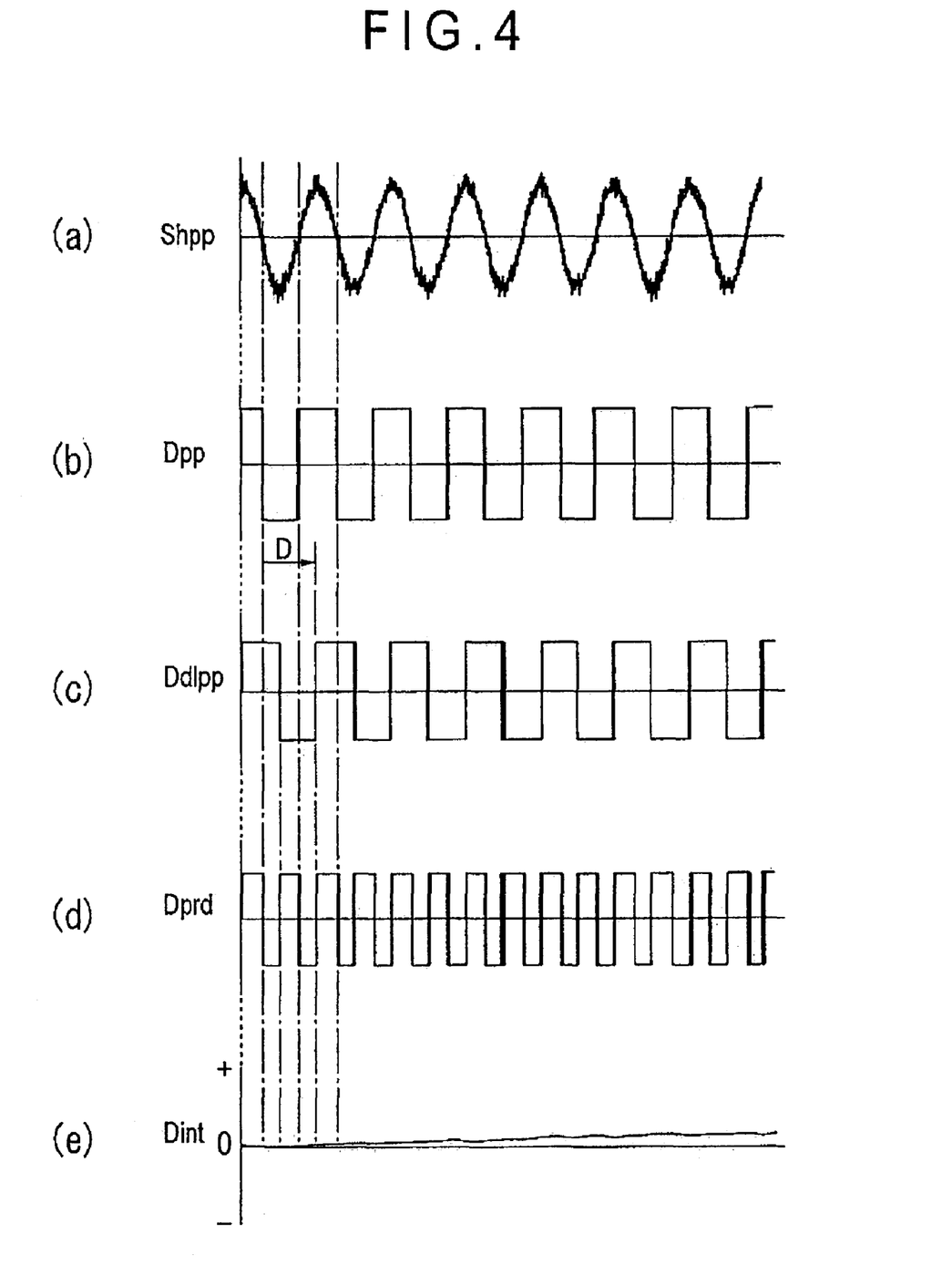
FIG. 4 is a waveform diagram showing change of each signal in the wobble signal detecting circuit 200 when a sinusoidal wave signal having the frequency higher than ½ D is being received as a smoothing signal Shpp.
Figure 5:
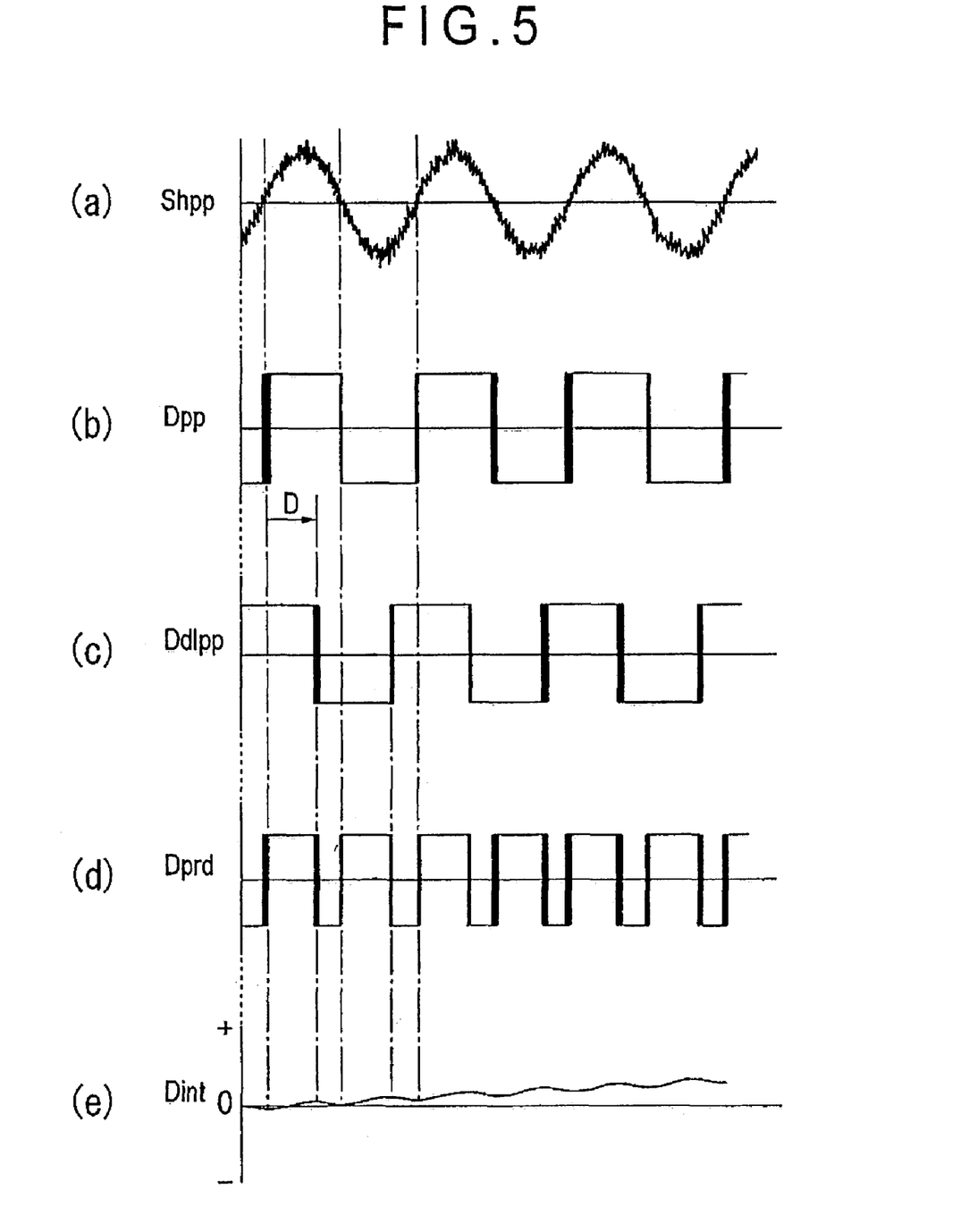
FIG. 5 is a waveform diagram showing change of each signal in the wobble signal detecting circuit 200 when a sinusoidal wave signal having the frequency lower than ½ D is being received as a smoothing signal Shpp.

Basic operations of the autocorrelation computing circuit 210 are described in detail below with reference to FIG. 3 to FIG. 5. FIGS. 3 to 5 are waveform diagrams showing signal changes in the autocorrelation computing circuit 210 when a sinusoidal wave signal with the frequency of ½ D (cycle: 2D) is received as the smoothing signal Shpp, when a sinusoidal wave signal with the frequency higher than ½ D is received, and when a sinusoidal wave signal with the frequency lower than ½ D is received respectively. Herein the D indicates a delay time in the delay/sign-negator 212. In these figures, a waveform of the smoothing signal Shpp trembles minutely, because the smoothing signal contains noise components.

At first, the case is described where a sinusoidal wave signal having the frequency of ½ D is received as the smoothing signal Shpp. In FIG. 3, the smoothing signal Shpp shown in the section (a) is converted to a digital signal consisting of "H" and "L" by the binarizing circuit 202. This digital signal is converted by the data converter 211 to a discrete value with positive or negative sign (+1/−1), and is outputted as the discrete value output signal Dpp as shown in the section (b). This discrete value output signal Dpp is delayed and sign-negated (inverted) with the time delay D by the delay/sign-negator 212, and is outputted as the delayed/sign-negated output signal Ddlpp as shown in the section (c). A half cycle of the discrete value output signal Dpp is equal to the delay time D effected by the delay/sign-negator 212, so that a waveform of the delayed/sign-negated output signal Ddlpp is a rectangular waveform substantially equal to that of the discrete value output signal Dpp. Then the delayed/sign-negated output signal Ddlpp and the delayed/sign-negated output signal Ddlpp are multiplied by the multiplier 213, and is outputted as a multiplied value output signal Dprd as shown in the section (d). As described above, the discrete value output signal Dpp is substantially equal to the delayed/sign-negated output signal Ddlpp, so that the multiplied value output signal Dprd generated as described above takes a positive discrete value in the substantially entire period excluding edge periods of discrete value output signals Dpp and the delayed/sign-negated output signal Ddlpp. Therefore, when the multiplied value output signal Dprd is integrated by the integrator 214, the integrated value output signal Dint amplifies in the ever-increasing mode as shown in the section (c). As described above, when a sinusoidal wave signal with the frequency of ½ D is received as the smoothing signal Shpp, the autocorrelation computing circuit 210 rapidly amplifies the integrate value output signal Dint in the over-increasing mode.

Then the case is described in which a sinusoidal wave signal with a frequency higher than ½ D is received as the smoothing signal Shpp. As shown in FIG. 4, the smoothing signal Shpp shown in the section (a) is converted by the binarizing circuit 202 and the data converter 211 to the discrete value output signal Dpp shown in the section (b). The discrete value output signal Dpp is delayed and sign-negated by the delay/sign-negator 212 with the delay time D prolonged and the sign-negated, and is outputted as the delayed/sign-negated output signal Ddlpp as shown in the section (c). It is to be noted that, as a half cycle of the discrete value output signal Dpp is shorter than the delay time D in the delay/sign-negator 212, the delayed/sign-negated output signal Ddlpp has a rectangular waveform with a phase different from that of the discrete value output signal Dpp. Therefore, when the delayed/sign-negated output signal Ddlpp and the delayed/sign-negated output signal Dpp are multiplied by the multiplier 213, the multiplied value output signal Dprd generated as described above and as shown in the section (d) take positive or negative discrete values at the probability of about 50% respectively. Therefore, when the multiplied value output signal Dprd is integrated by the integrator 214, the multiplied value output Dint does not amplify almost at all as shown in the section (e). Thus, when a sinusoidal wave signal with a frequency higher than ½ D is received as the smoothing signal Shpp, the autocorrelation computing circuit 210 does not amplify the integrated value output signal almost at all.

Next the case is described where a sinusoidal wave signal with a frequency lower than ½ D is received as the smoothing signal Shpp. In FIG. 5, the smoothing signal Shpp shown in the section (a) is outputted as the discrete value output signal Dpp as shown in the section (b). The discrete value output signal Dpp is delayed and sign-negated by the delay/sign-negator 212, and is outputted as the delayed/sign-negated output signal Ddlpp with the delay time D prolonged as shown in the section (c). As a half cycle of the discrete value output signal Dpp is longer than the delay time D caused by the delay/sign-negator 212, so that the delayed/sign-negated output signal Ddlpp has a rectangular waveform with the phase different from that of the discrete value output signal Dpp. Therefore, like in the case where the smoothing signal Shpp contains a signal with the frequency higher than ½ D, the multiplied value output signal Dprd generated as described above takes a positive or negative discrete value as shown in the section (d), while the integrated value output signal Dint does not amplify almost at all as shown in the section (e). Thus, even when a sinusoidal wave signal with the frequency lower than ½ D is received as the smoothing signal Shpp, the autocorrelation computing circuit 210 does not amplify the integrated value output signal Dint almost at all. Further when a sinusoidal wave signal with a frequency substantially lower than ½ D is received as the smoothing signal Shpp, the autocorrelation computing circuit 210 attenuates the integrated value output signal Dint.

Therefore, the wobble signal detecting circuit 200 sets the D to ½ fwbl for the frequency fwbl of the wobble signal to be detected, and detects the wobble signal by checking the amplification rate of the integrated value output signal Dint.

Incidentally, a bit reproduction signal recorded in a disc can be regarded as random signal, i.e. as a signal not having the frequency of ½ D, so that all of the bit reproduction signals will hardly affect the result of integration. Similarly, ordinary noise also can be regarded as random signal, and therefore will hardly affect the result of integration.

Further the wobble signal detecting circuit 200 generates a minus value as a result of integration when the smoothing signal Shpp by the autocorrelation computing circuit 210 includes offset, so that erroneous detection of a wobble signal never occurs even when offset is included in the smoothing signal Shpp. Further as the smoothing signal Shpp has been subjected to simple digitalization, effect of level fluctuation due to non-uniformity of optical discs DK or optical systems never occur.

(Operations of the Maximum Value Holding Circuit)

Next basic operations of the maximum value holding circuit 220 are described with reference to the timing chart shown in FIG. 6.

Figure 6:
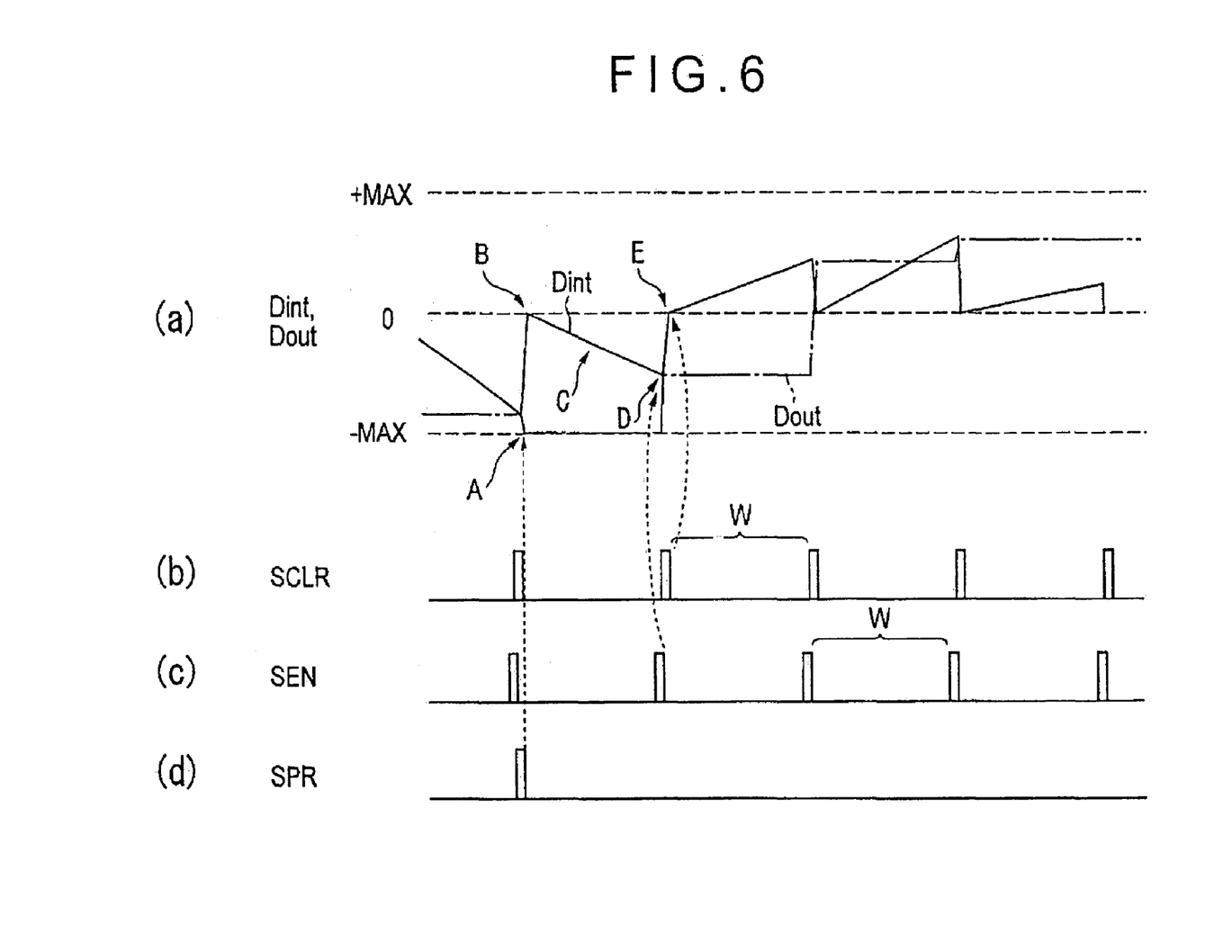
FIG. 6 is a timing chart illustrating a maximum value holding circuit 220.

FIG. 6 shows the case where the integrated value output signal Dint changes as shown in the section (a). The zero-clear signal SCLR and the latch enabling signal SEN, both with the same width of one reference clock signal SCK are generated, as shown in the sections (b) and (c), at a time interval W, and the latch enabling signal SEN is generated advanced by a width of one reference clock signal SCK before the zero-clear signal SCLR. The minimum value setting signals SPR with the same width of one reference clock signal SCK are generated at a time interval equal to an integral number N (N: two or more) times of a rotation cycle of the optical disc, and also are generated at the same time as any of the zero-clear signals SCLR (See the section (d) in FIG. 6). i.e. the minimum value setting signal SPR has a cycle an integral number times longer than that of the zero-clear signal SCLR.

When the minimum value setting signal SPR is generated, the maximum value holding circuit 220 in the wobble signal detecting circuit 200 sets a maximum value output signal Dout at the minimum value (−MAX) (as indicated by the arrow A in the section (a) in FIG. 6). At the same time, the zero-clear signal SCLR is generated, and the integrator 214 clears the integrated output signal Dint to zero (as indicated by the arrow B in the section (a) in FIG. 6). The maximum value holding circuit 220 still continues to receive the integrated value output signal Dint (as indicated by the arrow C in the section (a) in FIG. 6), but holds the output at the minimum value. When the latch enabling signal SEN is generated after a predetermined period of time W passes, the maximum value holding circuit 220 compares a value of the integrated value output signal Ding at the point of time to a value of the maximum value output signal Dout, and sets either larger value (the integrated value output signal Dint in the case shown in FIG. 6) as the maximum value output signal Dout (as indicated by the arrow D in the section (a) in FIG. 6). When the zero-clear signal SCLR is generated, the integrator 214 clears the integrated value output signal Dint to zero (as indicated by the arrow E in the section (a) in FIG. 6). Then, the operations A to E described above are repeated until the minimum value setting signal SPR is generated, and the maximum value holding circuit 220 outputs the maximum value of the integrated value output signal Dint as the maximum value output signal Dout.

(Operations of the Optical Disc Drive)

Figure 7:
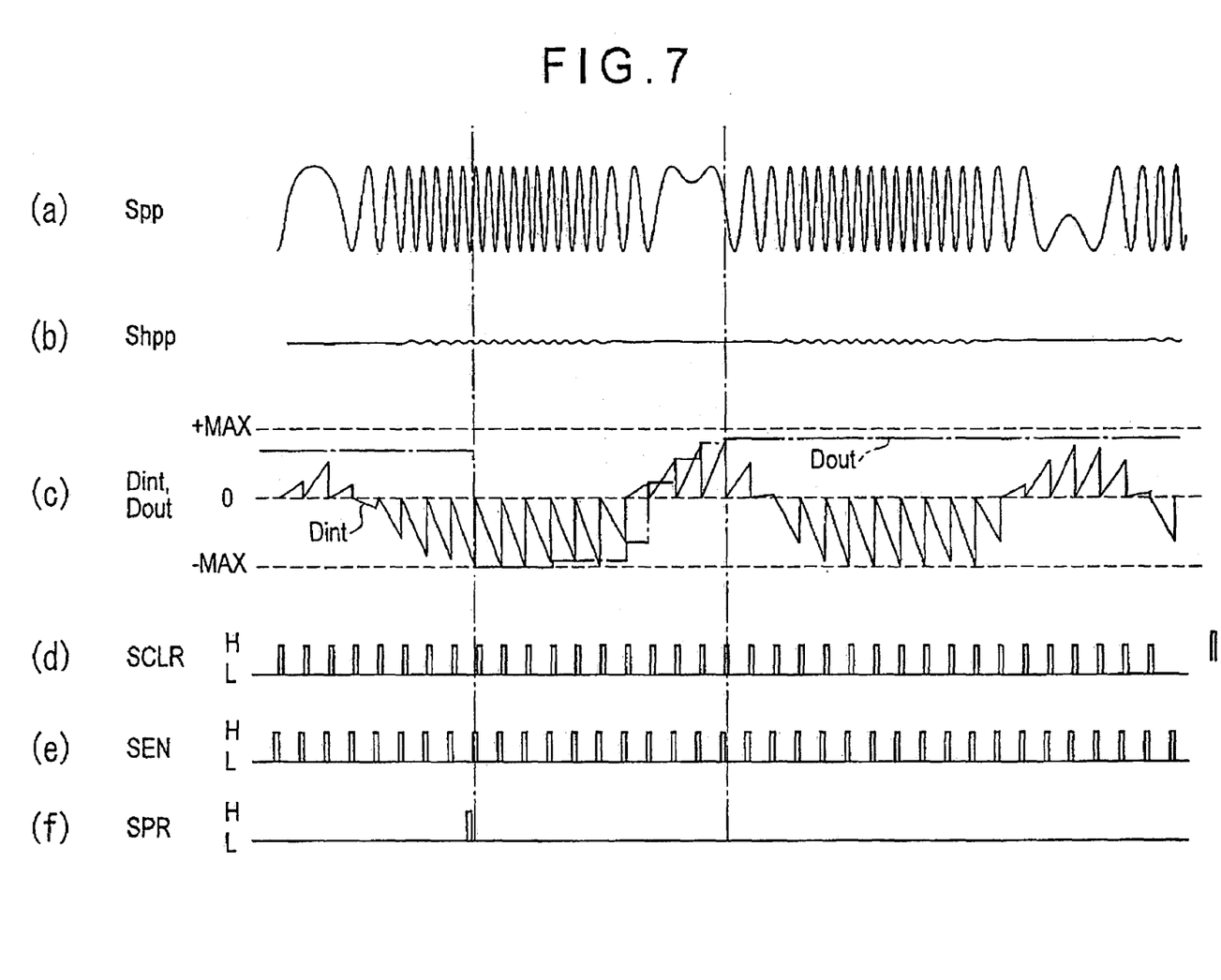
FIG. 7 is a waveform diagram showing change of each signal when a DVD-R/RW, writable optical disc, is set in the optical disc drive 100.
Figure 8:
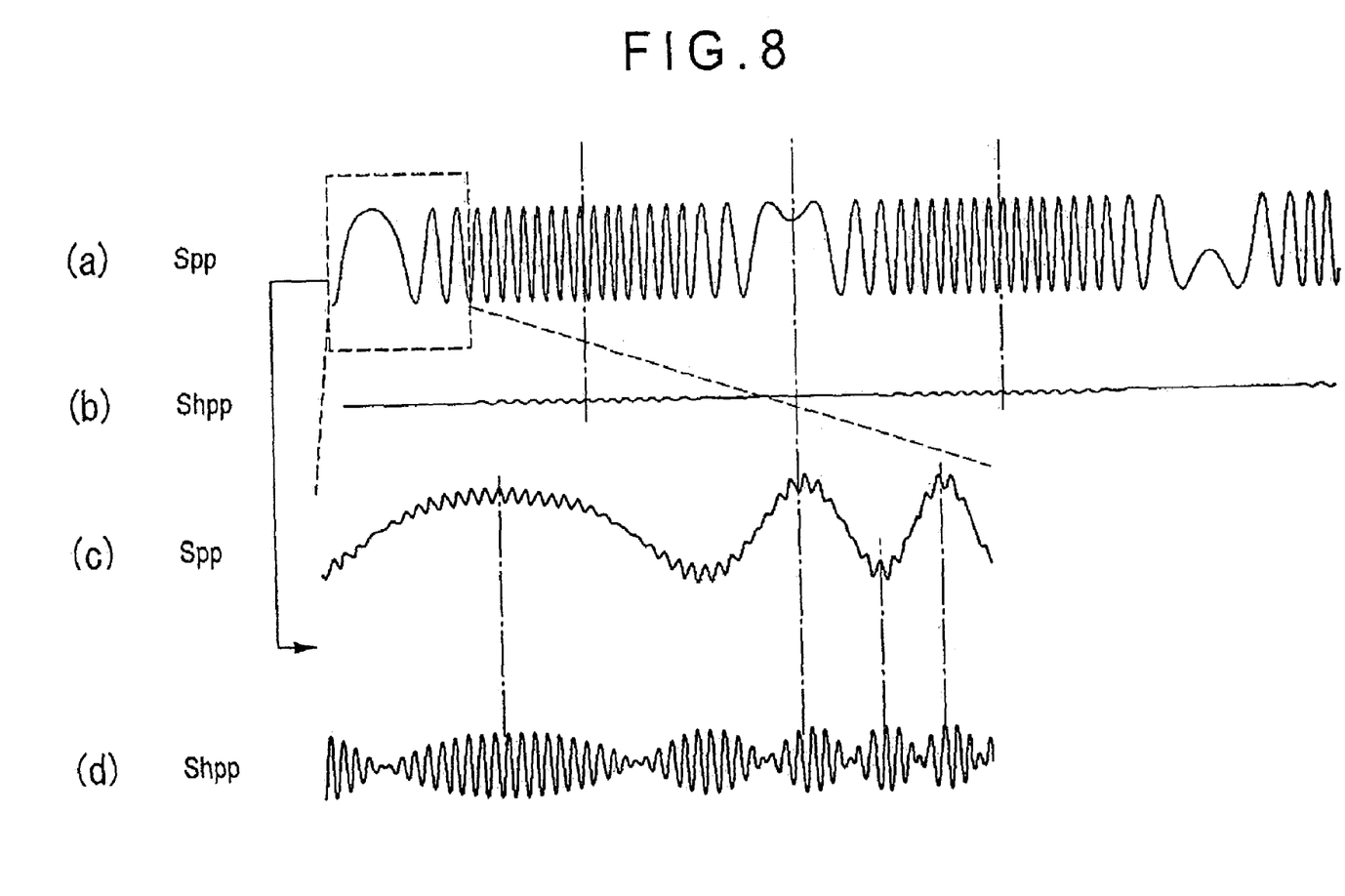
FIG. 8 is a partially enlarged view showing a radial push-pull signal Spp and a smoothing signal Shpp shown in FIG. 7.
Figure 9:
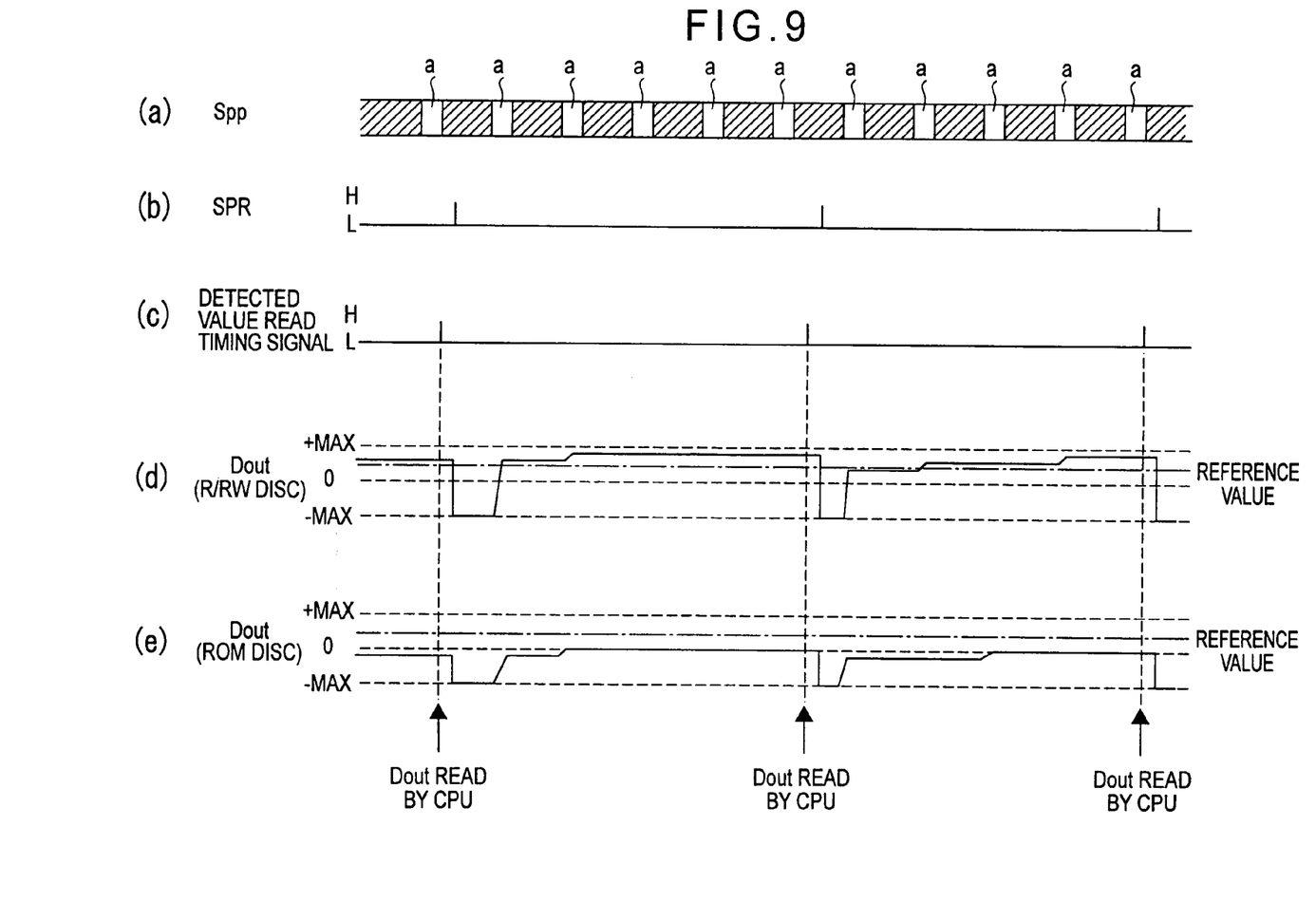
FIG. 9 is a waveform diagram showing a signal change of a maximum value output signal Dout and timing for reading the signal in the case where a DVD-ROM, read-only optical disc, is set in the optical disc drive 100, and in the case where a DVD-R/RW, writable optical disc, is set therein.

Operations of the optical disc drive 100 according to the present embodiment for determining a type of each optical disc are described below with reference to FIG. 1, FIG. 2, and FIG. 7 through FIG. 9. FIG. 7 is a waveform diagram showing signal changes when a DVD-R/RW, which is a writable optical disc, is set therein. FIG. 8 is a partially enlarged view showing the radial push-pull signal Spp and the smoothing signal Shpp shown in FIG. 7. FIG. 9 is a waveform diagram showing signal changes in the maximum value output signal Dout and the timing for reading the signal changes when a DVD-ROM, which is a read only optical disc, is set, and when a DVD-R/RW, which is a writable optical disc, is set each in the optical disc drive 100.

Before starting the operations for determining a type of an optical disc DK set therein, at first the optical disc drive 100 opens the tracking servo control for enabling reproduction.

The detailed processing sequence is as follows:

(1) The light pick-up 101 is removed to a known position in the radial direction of the optical disc DK, for instance to the innermost peripheral position of the disc (Radius: 25 mm).

(2) A light beam is irradiated onto the optical disc DK with the focus servo control closed, and a focus of the light beam is locked on a recording surface of the optical disc. In this step, the tracking servo control is still kept open.

(3) The optical disc DK is rotated so that a half cycle of the wobble signal included in the radial push-pull signal Spp matches the delay time D caused by the delay/sign-negator 212 (FIG. 2).

In the state described above, the light beam irradiated from the light pick-up 101 crosses the groove in the lateral direction due to radial runout of the optical disc DK. The radial push-pull signal Spp generated by the signal generating circuit 103 (FIG. 1) changes the amplitude each time the light beam crosses the groove as shown in the section (a) in FIG. 7, and the cycle changes according to the speed at which the light beam crosses the groove. Namely, when the light beam crosses the groove in the diagonal direction, the cycle of the radial push-pull signal Spp becomes shorter, and as the direction of the light beam becomes more parallel to the groove, the cycle of the radial push-pull signal Spp becomes longer. When the direction of the light beam is substantially parallel to the groove, the portion of the radial push-pull signal Spp, which has the longest cycle and therefore changes the mildest, is called a turning portion.

In the turning portion, the light beam is substantially parallel to the wobbled groove with the tracking servo control closed. Therefore, when the turning portion is enlarged, a wobble signal generated in association with the wobbled groove is included in the radial push-pull signal Spp (as shown in the section (c) in FIG. 8).

As shown in the section (c) in FIG. 8, as amplitude of the wobble signal included in the turning portion is smaller than the amplitude change generated when the light beam crosses a groove on the optical disc Dk, the wobble signal is not detected. Because of this feature, the HPF 201 (FIG. 2) removes large changes in amplitude of the radial push-pull signal Spp caused by radial runout of the optical disc DK, and outputs the radial push-pull signal as the smoothing signal Shpp (See section (d) in FIG. 8).

The autocorrelation computing circuit 210 computes, by means of the autocorrelation, to check whether a wobble signal is included in the smoothing signal Shpp or not, and outputs the integrated value output signal Dint. The maximum value holding circuit 220 detects the maximum value of the integrated value output signal Dint, and outputs the maximum value output signal Dout. The timing for generating the zero-clear signal SCLR, latch enabling signal SEN, and minimum value setting value SPR for controlling the autocorrelation computing circuit 210 and the maximum value holding circuit 220 is shown in FIG. 7 (in the sections (d) to (f) respectively).

The predetermined period of time W shown in FIG. 6, i.e. the integration zone for generating the integrated value output signal Dint is required only to be less than the length of the turning portion of the radial push-pull signal Spp. It is to be noted that the integrated value output signal Dint for a portion other than the turning portion, namely for a portion in which the signal change is heavy, satisfies either one of the following conditions.

(1) A time zone in which the wobble signal appears is short in a portion other than the turning portion, and the integrated value output signal Dint does not become sufficiently large.

(2) In a portion other than the turning portion, the signal components generated by fluctuation due to radial runout of a disc are not sufficiently removed in the HPF 201, and remain as residual components (as shown in the section (b) in FIG. 7 and in the section (b) in FIG. 8). As the frequency component for the fluctuating components are lower than the above-described frequency fwbl, the integrated value output signal Dint becomes smaller (as shown in the section (c) in FIG. 7).

In either case, however, as the maximum value among the integrated values (maximum value output signal Dout) is updated every time when the light beam passes through the turning portion, no effect will be caused in any portion other than the turning portion.

The CPU 105 reads a value of the maximum value output signal Dout fetched by the maximum value holding circuit 220, and compares the read value to a prespecified reference value to determine whether a wobble signal has been detected or not, i.e. whether the optical disc currently set is a writable optical disc (DVD-R/RW) having a wobbled groove thereon or a read only optical disc (DVD-ROM).

The operations performed for the determination are shown in FIG. 9. When the minimum value setting signal SPR is generated, i.e. at the level H (as shown in the section (b) in FIG. 9), the maximum value holding circuit 220 sets the maximum value output signal Dout at the minimum value (−MAX) (as shown in section (d) and section (e) in FIG. 9). When the optical disc DK currently set is a writable optical disc (DVD-R/RW), the maximum value holding circuit 220 rapidly raises the maximum value output signal Dout, and the level surpasses the reference value for the CPU 105 after the turning portion a is passed through several times).

In contrast, when the optical disc currently set is a read only optical disc (DVD-ROM), even after the turning portion is passed for several times, as the bit reproduction signal is random signal, the maximum output signal Dout generated by the maximum value holding circuit 220 surpasses the 0 level only a little, and never surpasses the reference value. The CPU 105 reads the maximum value output signal Dout several times in response to a detected value read timing signal generated just before each minimum value setting signal SPR (section (c) in FIG. 9), and determines whether the value is over the reference value or not.

As described above, the optical disc drive 100 according to this embodiment determines a type of an optical disc DK in the reproducing state wherein the tracking servo control is open, and comprises the signal generating circuit 103 for generating a radial push-pull signal Spp based on a read signal sent from the PU 101, a wobble signal detecting circuit 200 for detecting a wobble signal included in the radial push-pull signal Spp sent from the signal generating circuit 103 by means of autocorrelation, and the CPU 105 for determining the type of an optical disc DK set thereon according to the detected value sent from the wobble signal detecting circuit 200.

With this configuration, the optical disc drive 100 can detect a wobble signal keeping the tracking servo control open even when the determination of the type of the optical disc DK according to a level of the radial push-pull signal Spp is difficult, so that it is possible to determine whether an optical disc currently set thereon is a read only optical disc DK or a writable optical disc DK.

Generally it is difficult to set a reference level used for determination because of non-uniformity of optical discs DK, so that sometimes erroneous determination may be made for certain types of optical discs during the determination depending on a level of the radial push-pull signal Spp. In this case, if the tracking servo control is closed based on the erroneous tracking system, the PU 101 may be broken. In contrast, with the optical disc drive 100 according to the present invention, it is possible to determine the type of an optical disc DK without closing the tracking servo control, and therefore it is possible to select a tracking system corresponding to the type of an optical disc to be determined is possible.

Further as the optical disc drive 100 detects a wobble signal by means of the autocorrelation, a result of the determination is not affected by noises due to a recording bit array, nor by non-uniformity of a level of the radial push-pull signal Spp. It is conceivable to detect a wobble signal with a band pass filter (BPF), however, it largely depends on the signal level, and sometimes a noise component may erroneously be detected as a wobble signal. In this respect, use of the autocorrelation is better.

In addition, the optical disc drive 100 is never adversely affected by noises or other factors, so that the time required for determination of a type of an optical disc can be shortened and the result of the determination is more accurate.

An LSI can be used for almost all portions of the wobble signal detecting circuit 200 constituting the optical disc drive 100, which in turn makes it possible to easily reduce the size and the production cost thereof.

Further the optical disc drive 100 is not adversely affected excluding the turning portion, so that a circuit for detecting signal changes in the turning portion is not required, which enables simplification of the circuit configuration.

VARIANTS OF THE EMBODIMENT

The present invention is not limited to the embodiment described above, and a number of variants are possible within the scope in which the objects of the present inventions can be achieved.

An object for determination by the optical disc drive 100 is an optical disc DK including a DVD-ROM and a DVD-R/RW, but the object for determination is not limited to the optical disc, and determination can be made between a recording medium without a wobbled groove and a recording medium with a wobbled groove formed thereon, such as between a CD-ROM and a CD-R/RW.

The wobble signal detecting circuit 200 can be used for various applications so long as it is used for detection of a wobble signal by means of the autocorrelation.

Further the delay time in the delay/sign-negator 212 was set to a half cycle of a wobble signal in a DVD-R/RW, but the configuration is allowable in which the delay time can be changed by the CPU 105. With this configuration, also various types of recording media operating at different wobble frequencies can be determined.

What is claimed is:

1. A recording medium type determining apparatus for determining a type of an optical disc in the reproducing state according to the presence of wobble where the tracking servo control is kept open, said apparatus comprising:
    a signal generating section for generating a radial push-pull signal based on a read signal from a recording medium;
    a processing section for processing said radial push-pull signal by means of autocorrelation; and
    a determining section for determining the type of said recording medium based on the data sent from said processing section by detecting the presence of the wobble.

2. The recording medium type determining apparatus according to claim 1, wherein said processing section comprises:
    a filter section for reducing level fluctuation components due to radial runout of said recording medium included in said radial push-pull signal;
    a binarizing section for binarizing a signal outputted from said filter section;
    an autocorrelation computing section for computing an autocorrelation value for a signal sent from said binarizing section; and
    a maximum value detecting section for detecting a maximum value for a signal sent from said autocorrelation computing section.

3. The recording medium type determining apparatus according to claim 2, wherein said autocorrelation computing section comprises:
    a data converting section for converting a signal sent from said binarizing section to signed data;
    a delay/sign-negating section for delaying said signed data by a predetermined period of time and negating the sign;
    a multiplying section for multiplying said signed data by the sign-negated data sent from said delay/sign-negating section; and
    an integrating section for integrating the multiplied data sent from said multiplying section.

4. The recording medium type determining apparatus according to claim 3, wherein said predetermined period of time is a half cycle of a wobble signal included in said radial-push-pull signal.

5. The recording medium type determining apparatus according to claim 2, wherein said processing section comprises a signal generating section for generating signals for controlling said autocorrelation computing section and the maximum value detecting section.

6. The recording medium type determining apparatus according to claim 2, wherein said determining section determines, by comparing the maximum value sent from said maximum value detecting section to a prespecified reference value, whether said recording medium is a recording medium dedicated to read only one or a writable one.

7. A recording medium type determining method of determining a type of a recording medium in the reproducing state according to the presence of wobble where the tracking servo control is kept open, said method comprising:
    a signal generating step of generating a radial push-pull signal based on a read signal for a recording medium;
    a processing step of processing said radial push-pull signal by means of autocorrelation; and
    a determining step of determining the type of said recording medium based on the data sent from the processing step by detecting the presence of the wobble.

* * * * *